United States Patent [19]

Illingworth et al.

[11] Patent Number: 5,459,388
[45] Date of Patent: Oct. 17, 1995

[54] BATTERY PACK WITH MINIMUM HARD WIRING CONNECTION FOR PORTABLE COMPUTER

[75] Inventors: Patrick V. Illingworth, Tomball; Neil L. Condra, The Woodlands, both of Tex.

[73] Assignee: Compaq Computer Corp., Houston, Tex.

[21] Appl. No.: 119,426

[22] Filed: Sep. 10, 1993

[51] Int. Cl.[6] .......................... H01M 10/46; H01M 2/10
[52] U.S. Cl. .................................................. 320/2; 429/99
[58] Field of Search ................................. 320/2, 35, 36; 429/7, 96, 97, 98, 99, 100

[56] References Cited

U.S. PATENT DOCUMENTS

| | | | |
|---|---|---|---|
| 4,481,458 | 11/1984 | Lane | 320/2 |
| 4,647,832 | 3/1987 | Fenne et al. | 320/2 |
| 4,670,701 | 6/1987 | Sako et al. | 320/2 |
| 4,680,527 | 7/1987 | Benenati et al. | 320/2 |
| 4,942,352 | 7/1990 | Sano | 320/2 |
| 5,001,772 | 3/1991 | Holcomb et al. | 320/2 X |
| 5,111,128 | 5/1992 | Branan, Jr. et al. | 320/2 |
| 5,151,643 | 9/1992 | Emmert et al. | 320/2 |
| 5,164,652 | 11/1992 | Johnson et al. | 320/2 |
| 5,180,644 | 1/1993 | Bresin et al. | 429/98 |
| 5,191,277 | 3/1993 | Ishikura et al. | 320/2 X |
| 5,193,220 | 3/1993 | Ichinohe et al. | 320/2 X |
| 5,223,780 | 6/1993 | Hu | 320/2 X |
| 5,242,767 | 9/1993 | Roback et al. | 429/97 |
| 5,245,269 | 9/1993 | Tooley et al. | 320/2 |
| 5,298,347 | 3/1994 | Aksoy et al. | 429/98 |
| 5,307,519 | 4/1994 | Mehta et al. | 429/7 X |
| 5,360,683 | 11/1994 | Broadfield | 429/99 |

Primary Examiner—Peter S. Wong
Assistant Examiner—Robert Nappi
Attorney, Agent, or Firm—Pravel, Hewitt, Kimball & Krieger

[57] ABSTRACT

A battery pack for a portable or notebook computer which substantially eliminates hard wiring components including a generally rectangular housing having an opening in the bottom. The opening in the bottom receives a support chassis which mounts a series of electrical contact points for interfacing with the main computer housing. The support chassis mounts a printed circuit board which receives the electrical contact points for electrical connection to the various components of the printed circuit board such that electrical connection is made between the array of batteries and the main computer housing utilizing a series of electrical surface contact points rather than hard wiring, which preserves space and reduces manufacturing costs.

5 Claims, 1 Drawing Sheet

BATTERY PACK WITH MINIMUM HARD WIRING CONNECTION FOR PORTABLE COMPUTER

BACKGROUND OF THE INVENTION

1. Field of the Invention

The present invention relates to a battery pack for a portable computer wherein the battery pack has a minimum number of hard wire connections.

2. Description of Related Art

There is currently a trend in personal computers today toward portables such as notebook-size portables and even smaller computers. These small portable computers need a battery operated power supply utilizing rechargeable batteries. In order to monitor such rechargeable batteries and recharge in a timely and proper manner, it is known to hard wire into the battery pack a number of electronic components such as for example a temperature sensor and a microcomputer or memory to monitor various battery operations and maintain battery information. Examples of the electronics for monitoring and recharging a battery pack for a computer system are found in U.S. Pat. No. 5,313,228 issued May 24, 1994, and entitled "Battery Charge Monitor and Fuel Gauge" and 08/033,821 filed Mar. 19, 1993 and entitled "Battery Pack Including Static Memory and a Timer For Charged Management" owned by Compaq Computer Corporation, the Applicant herein.

Hard wiring various circuits within the battery pack is expensive and time-consuming since all of the hard wiring must be done by hand. The combination of hand soldering and hand installation adds significant additional manpower to manufacture of such battery packs. Further, the necessity of hard wiring within a battery pack adds additional space to the overall battery pack housing in order to mount such hard wiring within the battery pack housing.

SUMMARY OF THE INVENTION

It is an object of this invention to provide a battery pack for portable computer systems wherein the battery pack is interfaced with the main computer housing with a minimum amount of hard wiring, which reduces manufacturing costs and allows the overall battery pack housing to be smaller in size. The battery pack of this invention includes a generally rectangular housing which includes a bottom having an opening therein. The housing is sized to receive a plurality of batteries for providing power to the portable computer. A support chassis is mounted with the housing and includes a plurality of mounting slots, which mounting slots receive individual, electrical contacts. The support chassis is mounted over the opening in the bottom of the housing such that the electrical contacts are aligned with the housing bottom opening and are thus exposed for making electrical contact with circuitry of the main computer housing. A printed circuit board is attached to the support chassis. The printed circuit board includes a plurality of openings. The electrical contacts mounted in the support chassis mounting slots include tabbed end portions which extend through the openings in the printed circuit board in order to be electrically connected to the electronic components located on the printed circuit board. Hard wiring is necessary only to electrically connect the positive and negative terminal ends of the battery set within the battery pack housing. In this manner, a battery pack is provided which substantially minimizes the amount of hard wiring and instead provides electrical contacts mounted within a modular chassis for making electrical contact to the main computer housing.

This summary of the invention is intended as a summary only and is not intended to define the actual scope of the invention, which is set forth in the claims to follow the specification.

DESCRIPTION OF THE PREFERRED EMBODIMENT

Figure 1:
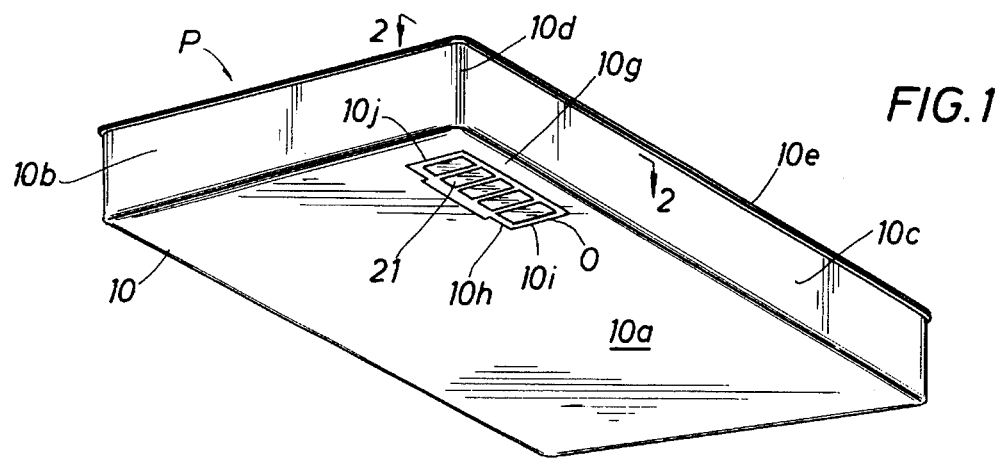
FIG. 1 is a bottom view in perspective of the battery pack of the preferred embodiment of this invention.
Figure 2:
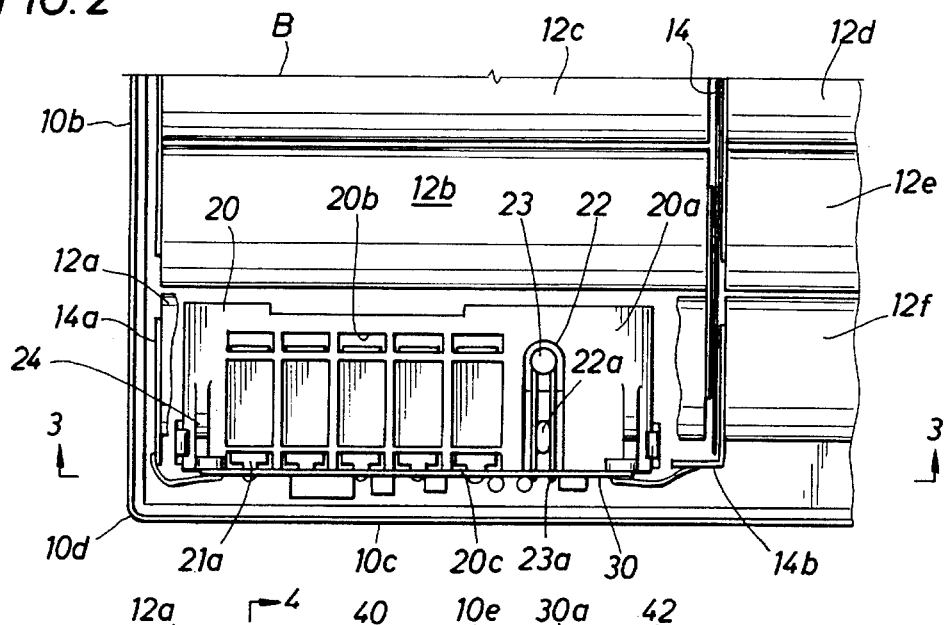
FIG. 2 is a sectional view taken along line 2—2 of FIG. 1 showing one of the batteries partially removed to expose the inside of the printed circuit board support chassis.
Figure 4:
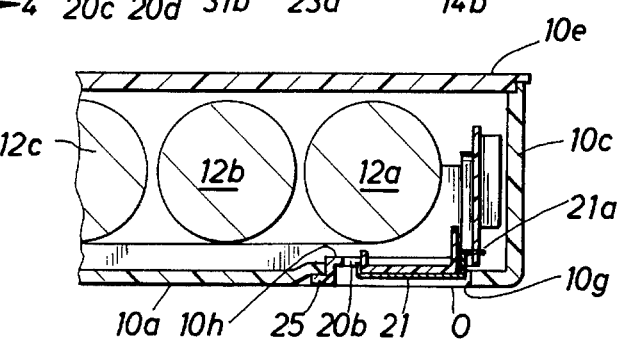
FIG. 4 is a sectional view taken along 4—4 of FIG. 3 illustrating the mounting of the support chassis in the opening in the bottom of the battery pack housing.

Referring to the drawings, the letter P generally designates the battery pack of the preferred embodiment of this invention. The battery pack P is specifically designed for use in a portable or notebook computer but has application in equivalent power systems. The battery pack P includes a generally rectangular, box-like housing 10 which includes a bottom 10a having formed therewith four sidewalls including side walls 10b and 10c which intersect to form a corner 10d. The housing 10 further includes a third sidewall which opposes sidewall 10b and a fourth sidewall which opposes sidewall 10c, neither of which is illustrated in the drawings but is easily understood as within the ordinary skill of the art. The upstanding sidewalls including sidewalls 10b and 10c are integrally formed with the bottom and cooperate to provide a generally rectangular box-like interior space to receive a plurality of batteries generally designated as B (FIG. 2). The housing 10 further includes a top or lid 10e which is generally rectangular in configuration and is sized to fit onto the four sidewalls such as 10b and 10c of the housing 10. A rectangular opening O is located in the bottom 10a of the housing 10. The opening O is formed by side edges 10g, 10h, 10i and 10j. Referring to FIG. 4, side opening edge 10h is slightly indented.

The batteries B are actually an array which are serially connected to provide the necessary voltage. Although not all batteries are shown, the batteries preferably utilized in this invention are 1.2-volt nickel metal hydride batteries connected in series to provide a total voltage of 12 volts. Referring to FIG. 2, batteries 12a, 12b, 12c, 12d, 12e and 12f are illustrated. The serial connection between batteries is provided by a series of conducting contact strips such as illustrated at 14 as is well-known in the art. Battery 12a includes a first terminal contact strip 14a and battery 12f includes a terminal contact strip 14b to the series connection of the batteries together. In addition and not shown, one or more fuses may be hard wired between various terminals of the batteries to act as circuit breakers or permanent disconnects in the event of power surges, shorts and the like.

A support chassis generally designated as 20 is provided for mounting within the battery housing 10 in the opening O in order to provide a wireless electrical interface between the batteries B, a printed circuit board generally designated as 30 and the main computer housing (not shown). The support chassis 20 includes a generally rectangular plate member designated as 20a. The plate member 20a includes a plurality of aligned openings 20b which cooperate with a second set of aligned openings 20c to provide mounting shoulders for a plurality of metal conducting strips or contacts 21. The outer face of the rectangular mounting plate 20a includes a plurality of ridges such as 20c and 20d which cooperate to receive the individually mounted electrical contacts or strips 21. As shown in FIG. 4, each electrical contact or strip 21 includes internally directed shoulders which are inserted into the openings 20b and 20c in order to snap the contacts into place in slots formed by the external ridges such as 20c and 20d.

Figure 3:
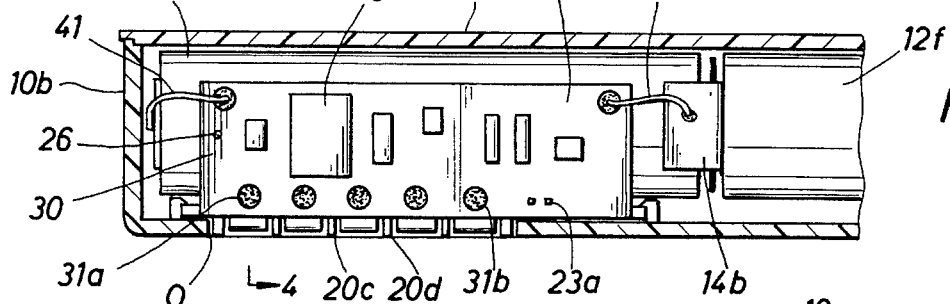
FIG. 3 is a partly sectional view taken along line 3—3 of FIG. 2 illustrating the printed circuit board and its hard wire connection to the array of DC batteries.

Each electrical contact or conductive strip 21 further includes an inverted, T-shaped tab portion 21a. Each of the inverted T-shaped tab portions 21a extend through openings at 31a and 31b in the base 30a of the printed circuit board 30. The tabs 21a for each of the five electrical contacts illustrated in the drawings extend through the openings at 31a and 31b in the base 30 for the printed circuit board and are soldered into place as illustrated in FIG. 3 (the actual openings in the base being filled by the solder as illustrated in FIG. 3).

Referring again to the inside surface or face of the chassis plate 20a a generally U-shaped opening 22 cooperates with a node 22a to mount a thermister element 23. The thermistor element 23 includes two terminal end portions, one of which being identified as 23a, which extend through openings in the base 30a of the printed circuit board 30 and are soldered in place. The soldered joints such as 31a and 31b and the terminated end portions such as 23a of the thermistor 23 are electronically connected to the various electronic components generally designated as 40 mounted on the printed circuit board base 30a. The thermistor is a temperature sensor which generates temperature dependent signals which are utilized in the various circuits of the electrical components to, among other things, timely re-charge the batteries. The location of the thermistor element 23 is such that it is in close proximity to the batteries B when the batteries B are installed in the housing 10, allowing the thermistor element 23 to accurately sense the temperature of the batteries B.

The chassis plate 20a further includes two laterally extending pedastals or ledges such as 24 which mount the printed circuit board base 30a thereon such that the printed circuit board base 30a is at a right angle with respect to the internal flat surface of the chassis support plate 20a. Each of the pedestals 24 include an outwardly extending node such as 26 which has an enlarged end and extends through an opening in the printed circuit board face so that upon snapping the opening over the enlarged end of the node 26, the printed circuit board 30 is attached to the pedestals or ledges 24 of the overall chassis 20.

The chassis plate 20a further includes a stepped mounting ledge generally designated as 25 for mounting the chassis in the opening O in the battery pack housing bottom. The chassis 20 is actually mounted in place from inside of the housing by first inserting the mounting ledge or lip 25 over the indented bottom opening edge 10h and then rotating the chassis into a frictional fit in the remainder of the opening O.

The printed circuit board 30 is provided to electronically interface between the batteries B and the main computer housing through the electrical contacts 21 which are exposed through the opening O in the bottom of the battery pack. The utilization of the five electrical contact surfaces of points 21 to interface with the main computer housing eliminates the necessity of hard wiring those contact points thereby reducing expense and labor in the manufacture of the battery pack P. The printed circuit board 30 includes the electronics generally designated as 40 to perform whatever necessary electronic functions are needed to properly maintain and recharge the array of batteries B. One version of such electronics is found in U.S. Pat. No. 5,313,228, issued May 24, 1994 entitled "Battery Charge Monitor and Fuel Gauge" and U.S. patent application Ser. No. 08/033,821 filed Mar. 19, 1993 and entitled "Battery Pack Including Static Memory and a Timer For Charged Management." Since the electronic components mounted on the printed circuit board do not form part of this invention, there is no need for further description of the components themselves.

In addition to the soldered connections of the electrical contacts 21 into the printed circuit board base 30a, and the electrical connection of the termination ends such as 23a of the thermistor 23 into the base 20a of the printed circuit board, it is necessary to hard wire the actual series connection of the battery array B to the printed circuit board. This is accomplished through soldering hard wire 41 to battery terminal contact 14a and soldering hard wire 42 to battery contact 14b. These two hard wire connections to the plus and minus side of the battery array B are the only hard wire connections necessary in electronically connecting the battery to the main computer housing through the other, wireless connections available at the contacts 21.

The combination of the chassis 20 and printed circuit board 30 in cooperation of the array of batteries B provide for a substantially wireless connection between the host computer and the battery pack. Further, the positioning of the chassis 20 in the opening O in the bottom of the battery pack places the chassis in an unobtrusive relationship with the actual bottom 10a of the housing such that the chassis takes up minimal space within the confines of the housing. Further, the utilization of the pedestals such as 24 to mount the printed circuit board 30 at a right angle to the chassis base plate 20a allows the printed circuit board to be positioned adjacent the upright side wall 10c once again mounting the components in a highly efficient manner within the confines of the battery pack housing. This efficient mounting of the chassis 20 and printed circuit board 30a in cooperation with the utilization of the series of electrical contacts 21 provide a wireless, compact battery power and electronic transfer unit for portable and notebook computers.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention. For example, while the housing 20 is described in terms of a bottom, sides and top, it is understood that actual mounting orientation may vary the position of the housing.

We claim:

1. A battery pack for a portable computer wherein the battery pack is interfaced to the computer with minimum hard wiring, comprising:

a generally rectangular housing including a bottom and opposing sides enclosed by a top, said opposing sides being joined to said bottom at a right angle, said bottom having an opening therein, said housing receiving a plurality of batteries therein to power said portable computer, each of said batteries being cylindrical in configuration;

a support chassis including a plurality of mounting slots, said support chassis being insertable into said bottom housing opening such that said support chassis mounting slots are aligned with said bottom opening;

an electrical contact being mounted in each of said plurality of support chassis mounting slots to provide a plurality of electrical contacts such that each of said electrical contacts are exposed through said housing bottom opening for electrical contact with the computer;

a printed circuit board being attached to said support chassis at a right angle with respect to said support chassis, said printed circuit board extending substantially parallel to and being located adjacent to one of said side walls, said printed circuit board having a plurality of openings therein, said printed circuit board mounting electronic components necessary to interface with said batteries;

each of said electrical contacts including a tabbed end portion extending through one of said plurality of openings in said printed circuit board, said tabbed end portion of each of said electrical contacts being mounted onto said printed circuit board in electrical connection with said electronic components; and, said electronic components being electrically connected to said batteries such that various electronic circuits are made from said batteries through said electronic components and electrical contacts to said computer.

2. The battery pack of claim 1, including:

a thermistor mounted with said support chassis so that said thermistor is located in close proximity to said batteries to sense the temperature of said batteries, said thermistor including first and second terminals which extend through openings in said printed circuit board in orders to be electrically connected to said electronic components on said printed circuit board.

3. The battery pack of claim 1, including:

first and second hard wires extending from electrical connection to said electronic components of said printed circuit board into electrical connection with said batteries.

4. The battery pack of claim 1, including:

said support chassis includes a generally rectangular plate, said mounting slots being formed in said plate;

said plate includes first and second pedestal portions formed therewith;

said printed circuit board being mounted on said pedestals and attached thereto.

5. The battery pack of claim 4, including:

said pedestals extending outwardly from said support plate for mounting said printed circuit board at a right angle with respect to said support plate;

said opposing sides of said generally rectangular housing being at right angles with respect to said bottom such that, with said mounting slots with said electrical contacts mounted thereon being positioned in said bottom housing opening, said printed circuit board is aligned with one of said opposing sides.

* * * * *

UNITED STATES PATENT AND TRADEMARK OFFICE
CERTIFICATE OF CORRECTION

PATENT NO. : 5,459,388
DATED : Oct. 17, 1995
INVENTOR(S) : Patrick V. Illingworth and Neil L. Condra It is certified that error appears in the above-identified patent and that said Letters Patent is hereby corrected as shown below:

In col. 6, line 5, please replace "orders" with --order--.

Signed and Sealed this

Second Day of January, 1996

Attest:

BRUCE LEHMAN

Attesting Officer

Commissioner of Patents and Trademarks